United States Patent [19]
Yaguchi

[11] Patent Number: 5,153,527
[45] Date of Patent: Oct. 6, 1992

[54] DEMODULATION APPARATUS HAVING RECEPTION STATE EVALUATION

[75] Inventor: Tatsuya Yaguchi, Yokohama, Japan

[73] Assignee: Canon Kabushiki Kaisha, Tokyo, Japan

[21] Appl. No.: 620,053

[22] Filed: Nov. 30, 1990

[30] Foreign Application Priority Data

Dec. 1, 1989 [JP] Japan .................................. 1-310515

[51] Int. Cl.$^5$ .......................... H03D 1/06; H04L 1/20
[52] U.S. Cl. .................................. 329/307; 329/318; 329/325; 375/8; 375/13; 375/81; 375/99
[58] Field of Search ............... 329/300, 302, 304, 306, 329/307, 308, 318, 320, 325; 375/8, 9, 80, 81, 99, 12-16

[56] References Cited

U.S. PATENT DOCUMENTS

| | | | |
|---|---|---|---|
| 4,247,940 | 1/1981 | Mueller et al. | 375/16 X |
| 4,631,596 | 12/1986 | Yaguchi | 368/256 |
| 4,672,631 | 6/1987 | Suzuki et al. | 375/14 |
| 4,847,880 | 7/1989 | Kamerman et al. | 375/8 |

*Primary Examiner*—Siegfried H. Grimm
*Attorney, Agent, or Firm*—Fitzpatrick, Cella, Harper & Scinto

[57] ABSTRACT

A signal modulated by original data is received and demodulated to output demodulated data. A number representing the correspondence of the original data with the outputted demodulated data or the lack of correspondence of the original data with the outputted demodulated data is counted. The count result representative of the suitability of the reception state of the receiver is outputted to a data processing circuit.

16 Claims, 7 Drawing Sheets

DEMODULATION APPARATUS HAVING RECEPTION STATE EVALUATION

BACKGROUND OF THE INVENTION

1. Field of the Invention

The present invention relates to a demodulator whose equalizer is adjusted so as to match the frequency characteristic of a transmission path.

2. Related Background Art

A modulator/demodulator (modem) is required in order to transmit and receive a digital signal data to and from a general public line (analog line) by converting a digital signal into an analog signal or vice versa. The outline of a modem is shown in FIGS. 5A and 5B.

Figure 5A:
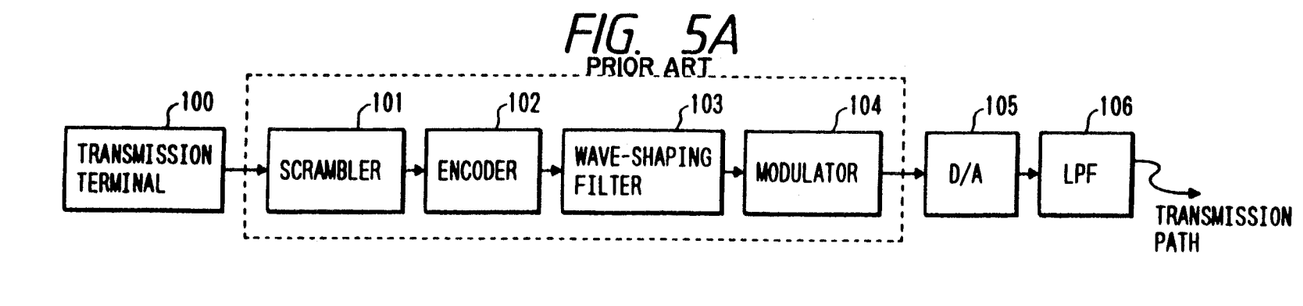
FIGS. 5A and 5B are block diagrams showing a conventional modem, respectively at the transmission and reception sides.
Figure 5B:
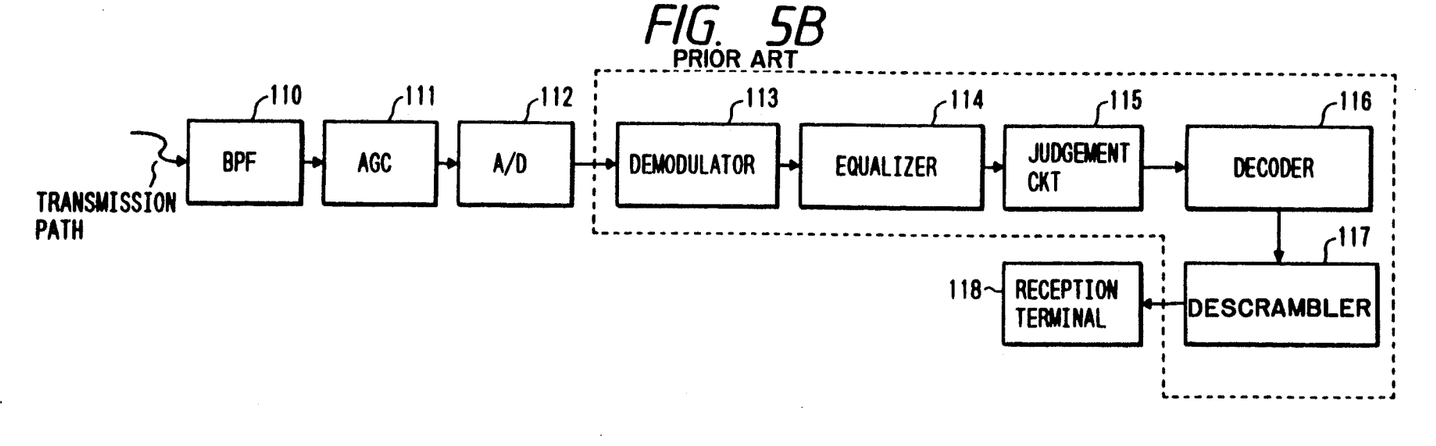

In FIGS. 5A and 5B, each circuit portion surrounded by a broken line is constructed of a digital signal processor (DSP). Reference numeral 100 represents a transmission terminal, and 118 represents a reception terminal. A scrambler 101 randomizes data in order to prevent the same data from being consecutively outputted. An encoder 102 encodes a signal from the scrambler 101 in units of a tribit, dibit or the like. A wave-shaping filter (roll-off filter) 103 prevents interruption between encoded signals. A modulator 104 modulates the encoded signal.

There are various modulating methods suitable for particular data transfer speeds. Typical methods include phase modulation which changes the phase of a carrier wave, frequency modulation (FSK) which changes the frequency of a carrier wave, amplitude modulation (AM) which changes the amplitude of a carrier wave, and quadrature amplitude modulation (QAM) which changes the amplitude and phase of a carrier wave.

A modulated signal is converted into an analog signal by a D/A converter 105 whose spurious harmonics are removed by a low-pass filter 106, and transmitted to a transmission path.

On the reception side, the components of a received signal other than those within the transmission band are removed by a band-pass filter 110. The received signal is then suppressed by an AGC 111 to a signal level suitable for being processed at the reception side, converted into a digital signal by an A/D converter 112, and demodulated by a demodulator 113 to the original signal (signal before modulation). Reference numeral 114 represents an equalizer which removes distortion components of the received signal to thereby derive the original transmitted signal, the distortion components having been added at the transmission path.

An output signal of the equalizer 114 is supplied to a judgment circuit 115 which judges a code point, and demodulated by a decoder 116. The demodulated signal randomized at the scrambler 101 is supplied to a descrambler 117 to recover the original signal at the transmission terminal 100 which is then sent to a reception terminal 118.

By using the modem described above, a digital data signal can be transmitted to and received from a general public line. In this case, the equalizer 114 operates to recover the original transmitted signal by removing distortions at the transmission path. The equalizer operation will be briefly described with reference to FIGS. 6, 7A, 7B and 7C.

Figure 6:
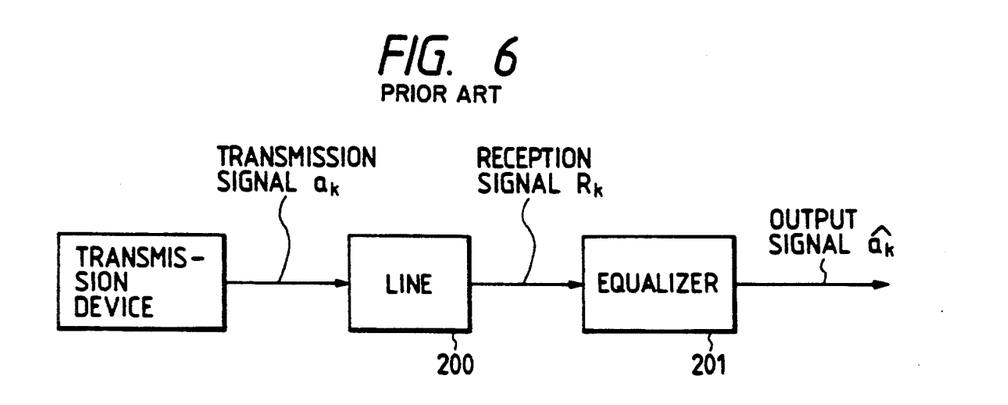
FIGS. 6, 7A, 7B and 7C are diagrams used for explaining the operation of a conventional modem.
Figure 7A:
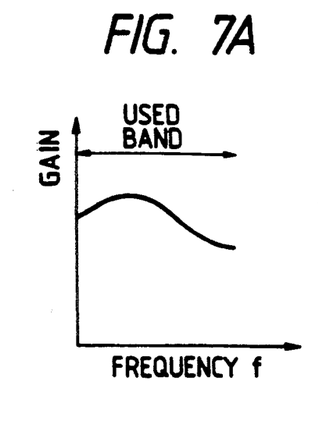
Figure 7B:
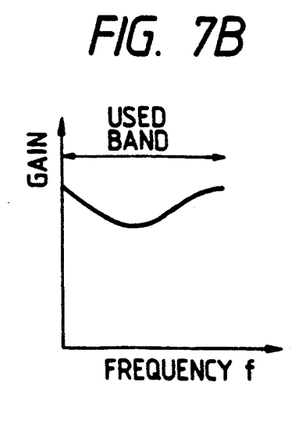

The frequency characteristic of a transmission path (line) 200 of FIG. 6 is shown in FIG. 7A, and the frequency characteristic of an equalizer 201 similar to the equalizer 114 is shown in FIG. 7B.

Figure 7C:
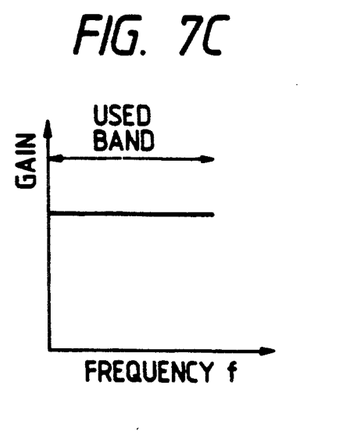

The frequency characteristics of the line 200 and equalizer 201 are reversed as shown in FIGS. 7A and 7B. The total frequency characteristic (convolution of both characteristics, simple multiplication within the used band) is flat within the used band as shown in FIG. 7C. Signal transmission is therefore possible without distortions.

The operation of the equalizer 201 is therefore to provide the reverse characteristic of the line 200. For general data communications, the reverse characteristic of the line relative to the equalizer is first formed by transmitting known data (training data) between the transmission and reception terminals, and thereafter a control (automatic equalization or adaptative equalization) is executed so as to make the equalizer characteristic follow a gentle change of the line characteristic with time.

Figure 8:
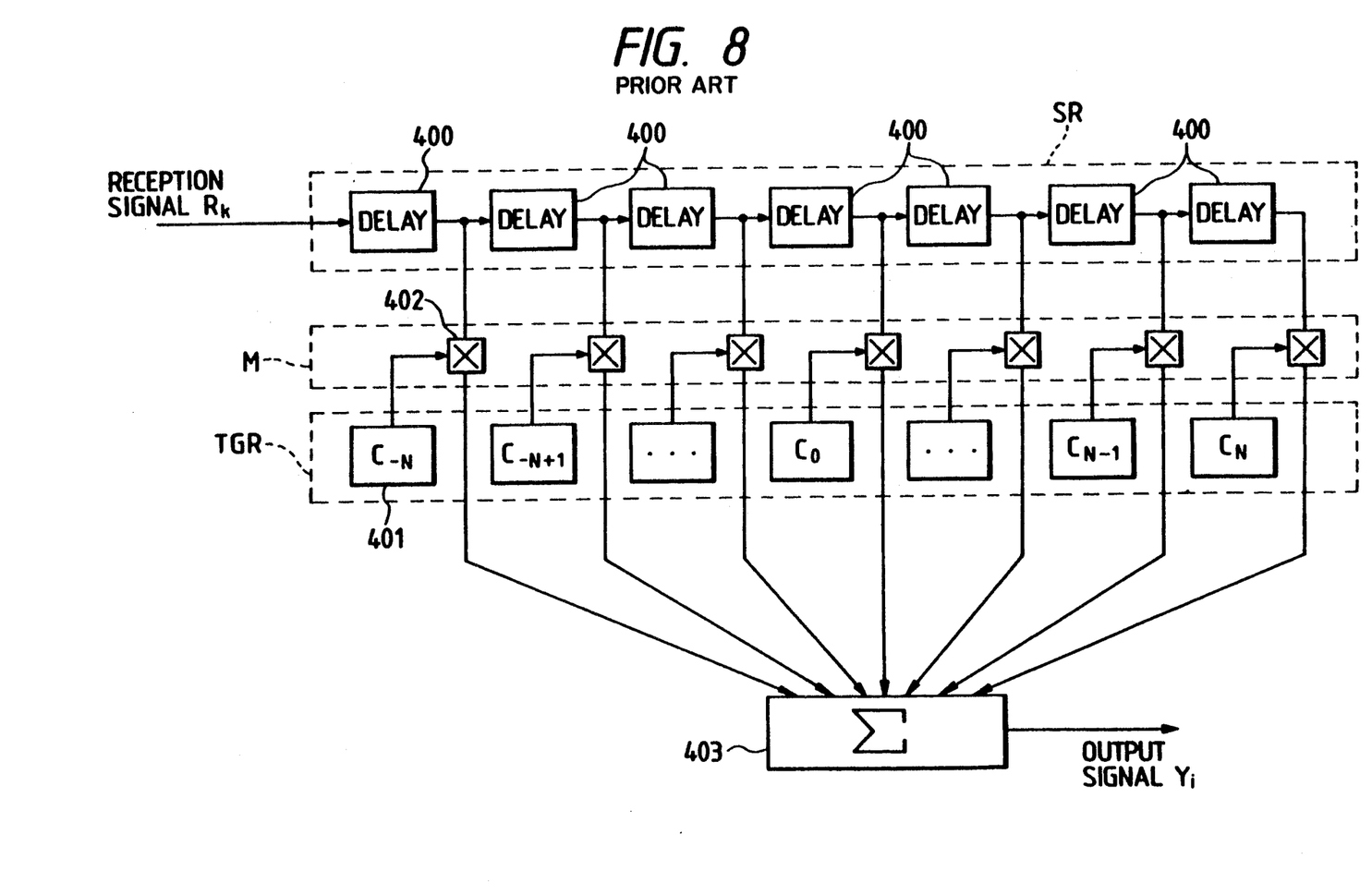
FIG. 8 is a block diagram showing an automatic equalizer.

FIG. 8 shows an example of the structure of a conventional equalizer. Generally, an equalizer is constructed of a transversal filter. Reference numeral 400 represents a delay element for delaying a reception signal $R_k$ by a predetermined time. Each delay element 400 constitutes a flip-flop of a reception data shift register SR. Reference numeral 401 represents a register for storing a tap gain $C_{-N}$ to $C_N$ by which a delayed reception data of the corresponding delay element is multiplied at a corresponding multiplier 402 of a multiplier group M. Registers 401 constitute a tap gain register TGR. As well known in the art, tap gains plotted at the time axis is called a unit impulse response whose Fourier transformation is the frequency characteristic of an equalizer as shown in FIG. 7B.

Reference numeral 403 represents an adder for generating a sum of respective delayed reception data each multiplied by a tap gain. Thus, an equalizer output signal $Y_k$ is given by:

$$Y_k = \sum_{i=-N}^{N} C_i \cdot R_k - i \tag{1}$$

The equalizer 201 sequentially calculates a tap gain for each reception data by means of a Mean Square Error (MSE) method to obtain an adaptive reverse characteristic of the line, the tap gain being given by:

$$C_l^{r+1} = C_l^r - \alpha \frac{\partial (y_k - a_k)^2}{\partial C_l} \tag{2}$$

where $C_l^{r+1}$ is a $(r+1)$-th calculated tap gain, $a_k$ is an estimated value of a reception data $a_k$, an estimated value $a_k$ for the training data being $a_k$, $\alpha$ is a convergence factor (generally $\alpha << 1$), and $Y_k - a_k$ an error signal ($e_k$).

The MSE method is an algorithm for making minimum the square error signal $e_k^2$. High speed and high precision of the equalization operation are required for a modem, and it is not too much to say that the speed and precision determine the performance of the modem.

Figure 9:
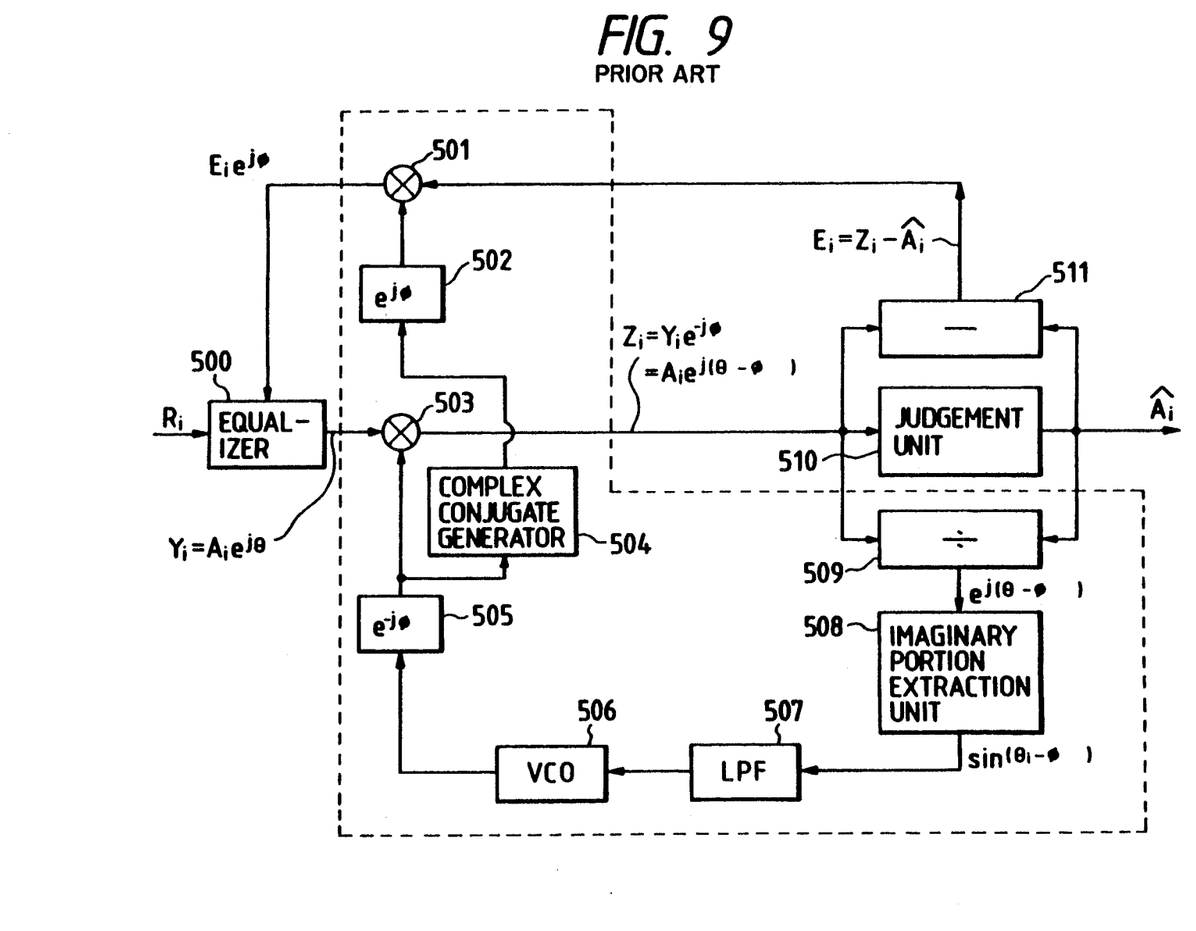
FIG. 9 is a block diagram showing a conventional equalizer with a PLL.

FIG. 9 shows the structure of a circuit for judging the equalization result obtained by a conventional modem.

Referring to FIG. 9, a demodulated complex signal $R_i$ is supplied from the demodulator at the reception side (demodulator 113 in FIG. 5B). An equalizer 500 constructed as shown in FIG. 8 recovers the original transmitted data with distortions at the line being removed.

$Y_i = A_i e^{j\theta_i}$ is a polar coordinate representation of the i-th output from the equalizer 500. A multiplier 503 multiplies an output $e^{-j\phi_{i-1}}$ of a complex number generator 505 by an equalizer output $Y_i \times A_i e^{j\theta_i}$ to output $Z_i = Y_i e^{-j\phi_{i-1}} = A_i e^{j(\theta_i - \phi_{i-1})}$.

A judgment unit 510 judges a code point Ai nearest a reception signal point which is an output of the multiplier 503. A subtracter 511 subtracts a code point from a reception signal point to output an error signal $E_i = Z_i - A_i$.

The error signal Ei is multiplied by an output $e^{j\phi_{i-1}}$ of a complex number generator 502 to obtain $E_i e^{j\phi_{i-1}}$ which is fed back to the equalizer 500, where $e^{j\phi_{i-1}}$ is a phase correction amount.

Next, a phase controller indicated as enclosed by a broken line in FIG. 9 will be described. A divider 509 divides Zi by Ai to obtain approximately $e^{j(\theta_i - \phi_{i-1})}$. An imaginary part extraction unit 508 outputs $\sin(\theta_i - \phi_{i-1})$ which is approximately equal to $\theta_i - \phi_{i-1}$ when $\theta_i \approx \phi_{i-1}$.

A voltage controlled oscillator VCO 506 and low-pass filter 507 constitute a phase locked loop PLL which outputs a phase value $-\phi_{i-1}$ canceling an input phase error.

The complex number generator 505 outputs $e^{-j\phi_{i-1}}$ which is supplied to the multiplier 503, and to a complex conjugate generator 504 which is connected to a complex number generator 502 to output $e^{j\phi_{i-1}}$ which is supplied to the multiplier 501, to thereby cancel the phase error of the whole system.

Channel equalization is carried out in the manner as above for data communications such as facsimile communications using a public telephone line.

Next, there will be described synchro signals used for channel equalization prior to transmission/reception of facsimile image data. Synchro signals conforming with the CCITT Recommendations V29 are shown in the following table.

In facsimile communications, when synchro signals are transmitted and received, consecutive "0" signals are outputted during 1.5±10% second, the signals being called a training check (TCF) which checks whether or not the channel characteristic has been equalized properly. The reception terminal of a modem therefore checks if there is no error, e.g., for one second within a TCF receiving period, which is used as a standard of the degree of channel equalization. If there is an error, the reception terminal considers that the channel equalization is insufficient, and sends back a training failure (FTT) to the transmission side to thereby conduct a fall-back. If there is no error, the reception terminal sends back a reception confirmation signal (CFR) to the transmission side without a fall-back, to thereafter allow transmission/reception of image data at the transmission speed same as that of the received synchro signals.

With the above-described conventional technique, the degree of line equalization is determined simply by detecting an error during the TCF receiving period. Therefore, even if the degree of line equalization is good, a fall-back will be performed if impulse noises or short time signal disconnections occur.

Furthermore, the TCF check is carried out at the reception terminal of a modem so that the circuit portion for controlling the reception terminal is forced to deal with additional load.

SUMMARY OF THE INVENTION

It is an object of the present invention to allow data communications at a speed suitable for the state of a line.

It is another object of the present invention to provide a demodulator which allows data communications at a suitable speed irrespective of impulse noises or short time signal disconnections.

It is a further object of the present invention to reduce a load on the circuit portion controlling a reception terminal.

| Format of Line Signal | Segment 1 No Transmission Energy | Segment 2 Alternative Patterns | Segment 3 Equalizer Adjusting Pattern | Segment 4 Scrambled Data "1" | Sum of Segments 1 to 4 Sum of Synchro Signals |
|---|---|---|---|---|---|
| No. of Symbol Interval | 48 | 128 | 384 | 48 | 608 |
| Approximate Time (msec) | 20 | 53 | 160 | 20 | 253 |

The function of synchro signals for each segment will be described. Segment 1 is used during a transmission preliminary period before segment 2 and following segments. No carrier is transmitted by segment 1. Segment 2 is used during a period for setting fundamental reception operation conditions such as setting AGC, deriving timings and the like, by alternately transmitting constellation patterns stipulated by the Recommendations V29. Segment 3 is used for the initial setting of an equalizer, and uses a pseudo random pattern so as to enable smooth convergence of an equalizer. Segment 4 is used during a period for establishing synchronization of a descrambler by supplying a signal obtained when segment 1 is inputted to a scrambler.

It is still another object of the present invention to provide a demodulator capable of correctly judging the state of a line.

Other objects of this invention will become apparent from the following description of the embodiment.

DETAILED DESCRIPTION OF THE PREFERRED EMBODIMENT

In the following description of the embodiment, a modem is provided which is capable of evaluating the degree of equalization with high reliability without judging as an equalization failure, irrespective of external disturbances such as impulse noise and short time signal disconnections.

According to this embodiment, while receiving predetermined data patterns after adjusting an automatic equalizer, a mean square error of equalization errors is calculated in accordance with an output from the automatic equalizer, and the mean square error is supplied to a reception apparatus (reception terminal control circuit) connected to the modem.

The equalization adjustment result of the automatic equalizer is therefore evaluated in accordance with a mean square error of equalization errors, resulting in improved reliability.

The equalization adjustment result can be evaluated more reliably if the above evaluation method is used with the method of evaluating the degree of equalization by counting the number of evaluation errors from an output of the automatic equalizer while receiving predetermined data patterns and by supplying the number to the reception terminal control circuit connected to the modem, or both the methods may be selectively used.

Figure 1:
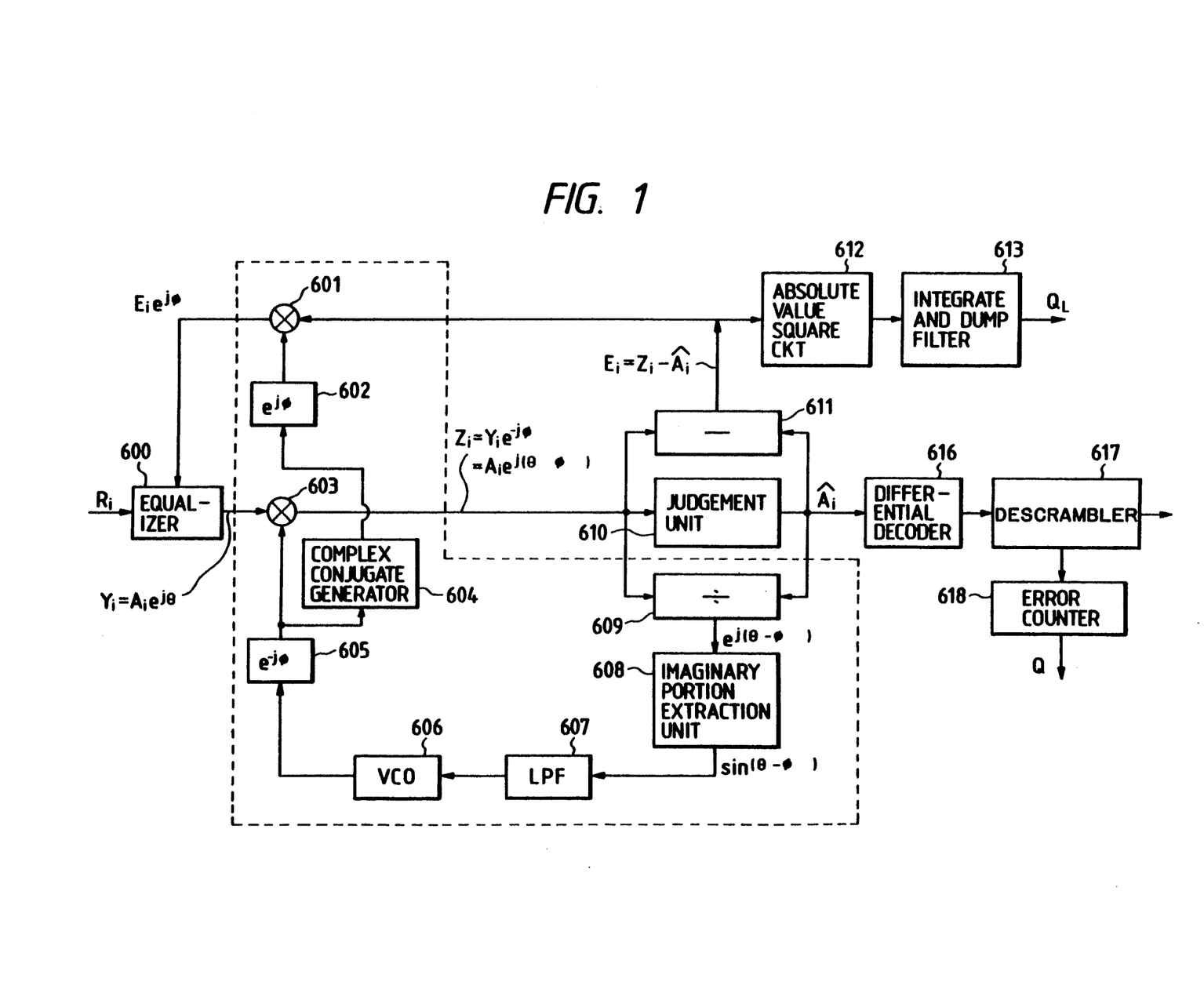
FIG. 1 is a block diagram of an automatic equalizer embodying the present invention.

The embodiment shown in the accompanying drawings will be described in detail. A modem used with a facsimile apparatus or the like will be described by way of example in the following. FIG. 1 shows a circuit for evaluating the equalization outputs, similar to the conventional circuit shown in FIG. 9.

FIG. 1 shows the structure of a mean square error calculating unit, and an equalizer with a PLL and a TCF error counter, according to the embodiment of this invention.

Referring to FIG. 1, elements 600 to 611 have the same function as elements 500 to 511 shown in FIG. 9, so the detailed description thereof is omitted.

A judgment unit 610 outputs a code point Ai nearest an equalization output Zi (reception signal point) with the phase error canceled. After the phase difference between the reception signal point Zi and the code point Ai is detected, a multiplier 603 cancels the phase difference from the phase of the equalizer output Yi.

A subtracter 611 detects an equalization error Ei. A multiplier 601 multiplies the equalization error Ei by a phase correction amount $e^{j\phi_i-1}$ to correct the equalization characteristic of the equalizer 600.

Figure 2:
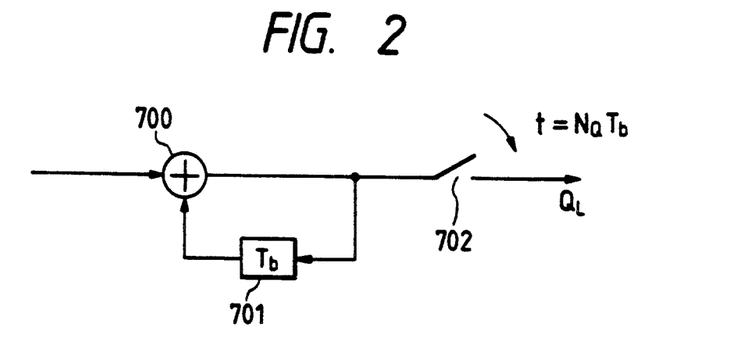
FIG. 2 is a block diagram of the integrate and dump filter shown in FIG. 1.

An output $Ei=Zi-Ai$ from the subtracter 611 is supplied to an absolute value square circuit 612, and filtered by an integrate and dump filter (IDF) 613 which is later described with reference to FIG. 2. The absolute value square circuit 612 obtains a square of the distance between the reception signal point and the code point.

An output from the absolute value square circuit 612 is accumulated by IDF 613 NQ times (symbol interval) set by a designer to output it as QL. QL takes a value near 0 if the line equalization degree is good and the line noise amount is small, and it takes a larger value if contrary.

IDF 613 shown in FIG. 1 will be described with reference to FIG. 2 wherein reference numeral 700 represents an adder, 701 a delay unit, and 702 a sampler.

The adder 700 adds an output of the absolute value square circuit 612 to an output of the delay unit 701. This addition is repeated at the interval of each output period of the absolute value square circuit 612. The sampler 702 samples the output of the adder 700 at the interval of NQ times set by the designer. Next, the value of the delay unit 701 is initialized. Namely, IDF 613 cumulatively adds Nq outputs from the absolute value square circuit 612.

The equalization judgment output Ai is inputted to a differential decoder 616 to differentially decode a multi-value signal to a binary signal (e.g., in the case of the transmission speed 9600 bps for the recommmendations V29, it is converted to a four-bit signal per one symbol).

An output of the differential decoder 616 is descrambled by a descrambler 617, and inputted to an error counter 618. The error counter 618 checks the descrambled results NQ times (symbol interval) set by the designer during the TCF signal receiving period, and counts the number of "1"s which is outputted as Qe. Alternately, the number of "0"s may be counted by checking an output of the descrambler 617.

Figure 4A:
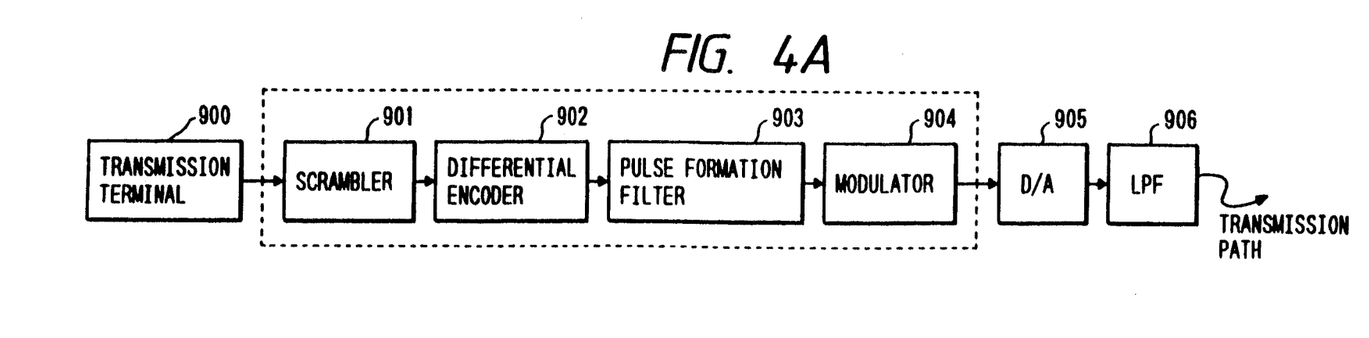
FIGS. 4A and 4B are block diagrams showing the modem according to the present invention, respectively at the transmission and reception sides.
Figure 4B:
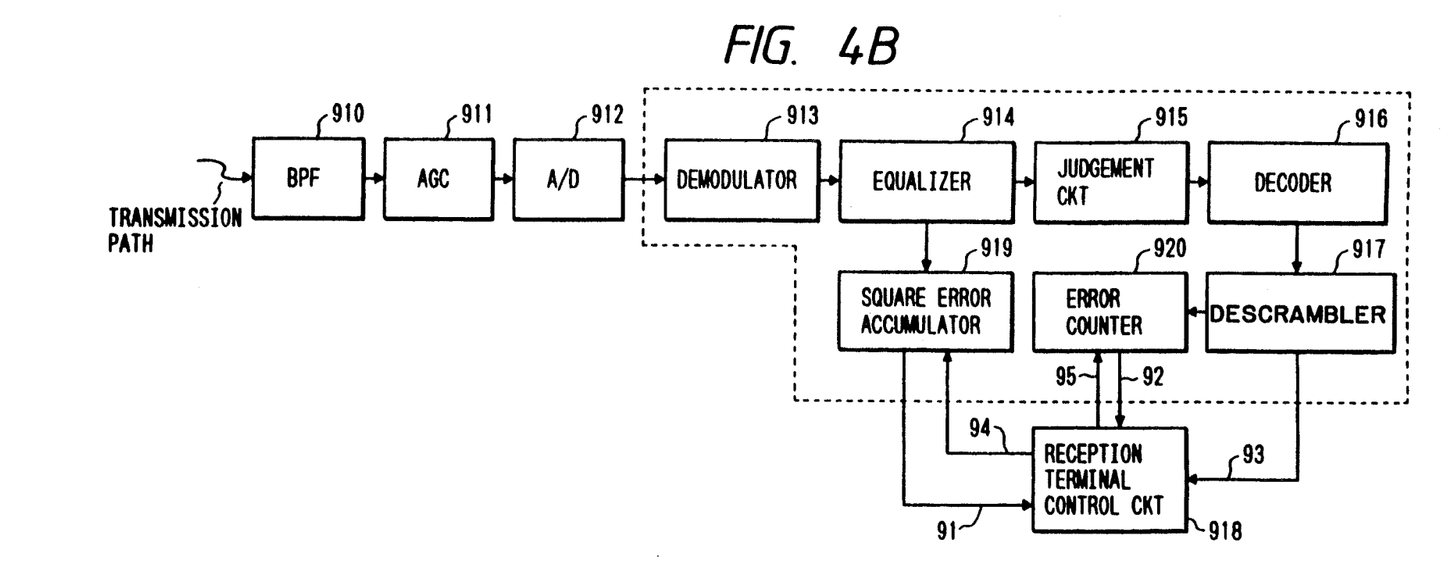

The structure of the modem embodying this invention is shown in FIGS. 4A and 4B. The structure of elements 900 to 906 at the transmission side and the structure of a band-bass filter, AGC, and A/D converter 910 to 912 at the reception side are the same as those shown in FIGS. 5A and 5B, so the detailed description thereof is omitted.

The different elements from the structure shown in FIGS. 5A and 5B are shown within a block surrounded by a broken line at the lower right side of FIG. 4B, and include a square error accumulator 919 (constructed of the absolute value square circuit 612 and IDF 613) for evaluating the operation of the equalizer 914, an error counter 920, data lines 91 and 92 for receiving the outputs of the elements 919 and 920 and sending them to a reception terminal control circuit 918, and control lines 94 and 95 connecting the reception terminal control circuit 918 to the elements 919 and 920.

The arrangement and the operation of the equalizer 914 and a judgment circuit 915 correspond to that of the equalizer 600, the judgment unit 610 and associated circuitry shown in and described with respect to FIG. 1. As described with respect to the equalizer 600 and the judgment unit 610 of FIG. 1, the equalizer circuit 914 and the judgment circuit 915 operate to provide an output to decoder 916, an adjustment of the equalizer circuit 914 and an output to square error accumulator 919.

While receiving data, the square error accumulator 919 obtains, as described above, the absolute value of an error vector of the equalizer 914, and accumulates it during the TCF receiving period This accumulated result is inputted via the data line 91 to the reception terminal control circuit 918.

The error counter 920 accumulates the number "1"s outputted from the descrambler 917 during the TCF receiving period as described with respect to descrambler 617 and error counter 618 in FIG. 1. This accumulated result is inputted via the data line 92 to the reception terminal control circuit 918. Instead of the number of "1"s, the number of "0"s may be accumulated and inputted to the reception terminal control circuit.

In the circuit arrangement described above, there are provided the error signal detection circuit at the modem equalization circuit portion, the calculation unit (square error accumulator 919 in FIG. 4B) for obtaining an accumulated mean square error, and the error counter at the output of the descrambler. Therefore, two types of information including the mean square error and an accumulated error are outputted, which are used as the standard for the line equalization degree.

Consequently, the reception terminal control circuit of a facsimile apparatus or the like can check the equalization degree, by using as the standard for the line equalization degree the accumulated mean square error 91 and the error count during the TCF receiving period, thereby allowing a more correct check of the line equalization degree irrespective of external disturbances such as impulse noises and short time signal disconnections.

Furthermore, with the structure as shown in FIGS. 4A and 4B, the TCF check can be carried out by the reception terminal control circuit connected to the modem, which has been heretofore carried out by the reception terminal of a facsimile or the like. Therefore, a load on the control circuit at the reception terminal can be reduced.

The reception terminal can evaluate the equalization adjustment result in accordance with the mean square error, the error count, or a combination thereof In this case, a switch may be used to select one or both of them. The square error accumulator 919 is not therefore required by all means.

Figure 3:
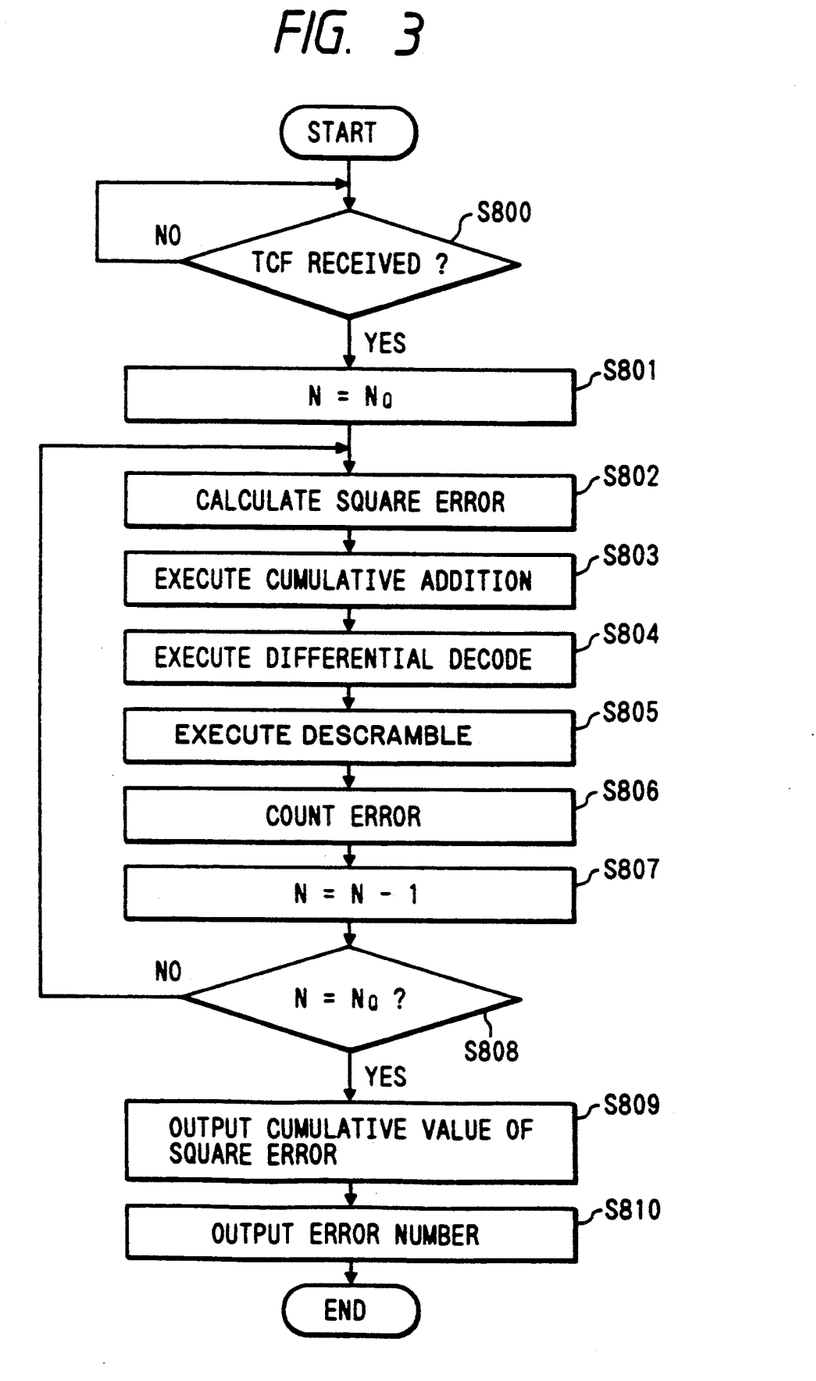
FIG. 3 is a flow chart showing the procedure of evaluating the degree of equalization according to the present invention.

The operation of the embodiment constructed as above will be described with reference to the flow chart shown in FIG. 3.

At step S800, the reception terminal control circuit 918 monitors the output 93 of the descrambler 917 to check if the demodulator receives the training check signal after the synchro signals. If received, the control advances to step S801, whereas if not, the training check signal is awaited. At step S801, the reception terminal control circuit 918 initializes via the control lines 94 and 95 the square error accumulator 919 and a loop counter N of the error counter 920. The loop counter is a symbol number counter for accumulating the square error and counting the error while receiving the training check signal. Therefore, if the loop counter N is set to NQ, the square error is accumulated NQ times, and the number of errors within NQ symbols is calculated.

At step S802, the absolute value square circuit 612 calculates a square of the absolute value of a difference (error vector) between an output of the equalizer 914 and the estimated symbol, and at step S803 IDF 613 accumulates the square error.

At step S804, the estimated symbol is differentially decoded and converted into a binary data which is descrambled at step S805. Since the TCF is being received, the descrambled result will be "0" if there is no error.

At step S806, the error counter 920 counts the number of errors or "1"s within the $N_Q$ symbols. At steps S807 and S809, the error counter 618 checks if the processes S802 to S806 have been repeated $N_O$ times or not. If repeated, the control advances to step S809, whereas if not, the steps S802 to S806 are again executed.

At step S809, the accumulated square error value is outputted, and at step S810 the number of errors is outputted.

In the above embodiment, as a standard for checking the equalization degree, the square error has been used. Instead, the absolute value of a distance between a reception signal point and an estimated signal point may also be used to realize a similar circuit arrangement.

Also in the above embodiment, a modem conforming with the CCITT Recommendation V29 has been used by way of example. A modem having a plurality of transmission speeds such as stipulated by the Recommendation V27 ter., V33 and the like may also be used to realize a similar circuit arrangement.

In the above embodiment, the square error is accumulated $N_Q$ symbol times. The number of accumulations is not limited thereto if it is executed within 1.5 second, according to the transmission control protocol of the CCITT Recommendations T30.

IDF (integrated dump filter) has been used as the accumulator. Instead, an ordinary low-pass filter may be used to realize the similar circuit arrangement.

Also in the above embodiment, the number of symbols is fixed to $N_Q$ for accumulating the mean square error and counting an error. Instead, a predetermined $N_Q$ value may be inputted to the modem from the reception terminal side in order to check the line equalization degree with high reliability if the line has much external disturbances such as impulse noises and short time signal disconnections. The value $N_Q$ for accumulating the mean square error and counting an error is not limited to be a common value for both cases, but a different value may be used for each case.

According to the embodiment structure, while receiving predetermined data patterns and adjusting an automatic equalizer, a mean square error of equalization errors is calculated in accordance with an output from the automatic equalizer, and the mean square error is supplied to the reception terminal connected to the demodulator.

The equalization adjustment result of the automatic equalizer is therefore evaluated in accordance with a mean square error of equalization errors, so that the equalization adjustment result can be correctly evaluated irrespective of external disturbances such as impulse noises and short time signal disconnections, without wasteful transmission speed fall-back.

Furthermore, the number of equalization errors is calculated from an output of the automatic equalizer while receiving predetermined data patterns, and is supplied to the reception terminal, thereby preventing wasteful fall-back to be caused by impulse noises and short time signal disconnections. Alternatively, by selecting either the accumulation of a mean square error or the counting of an error, the equalizer adjustment result can be evaluated with higher reliability.

The reception terminal control circuit 918 is not necessary to continuously monitor an output 93 of the descrambler 917 during the TCF period, but may check the error count output 92 when the error count 920 completes the error counting. This is also the case where the training check is carried out by the accumulated output 91 of the mean square error.

The reception terminal control circuit 918 may be adapted to instruct a fall-back to a communication partner if the error count output is 3 or larger for $N_Q=300$ for example. If "0" is counted in place of "1", a fall-back is instructed if the error count output is 297 or smaller.

The reception terminal control circuit 918 may be adapted to instruct a fall-back if the accumulated mean square error 91 is 10 or larger for $N_Q=300$ for example.

The present invention has been described in connection with the preferred embodiment. The invention is not limited to the embodiment structure, but various modifications are possible within the scope of the claims.

I claim:

1. A demodulating apparatus for demodulating a received signal and outputting the demodulated signal to a data processing circuit, comprising:
   receiving means for receiving a signal demodulated in accordance with a plurality of original data of predetermined value;
   demodulating means for demodulating said signal received by said receiving means and outputting a plurality of demodulated data corresponding to the original data;
   judging means for judging a plurality of times whether or not said demodulated data corresponds to the value of the original data; and
   counting means for counting a predetermined one of (1) a number of times that said judging means judges that said demodulated data output by said demodulating means corresponds to the value and (2) a number of times that said judging means judges that said demodulated data output by said demodulating means does not correspond to the value, and outputting a count result, representing that a reception state of said receiving means is suitable or not suitable, to the data processing circuit.

2. An apparatus according to claim 1, wherein said judging means compares a respective one of said demodulated data from said demodulating means with a respective predetermined value of a respective one of the original data to judge if said received signal was demodulated erroneously or correctly.

3. An apparatus according to claim 1, wherein said demodulating means includes equalizing means for equalizing said received signal, and said judging means compares said value with an output signal from said equalizing means.

4. An apparatus according to claim 1, wherein said counting means starts counting after an equalizing characteristic of said demodulating means has been initially corrected.

5. An apparatus according to claim 1, wherein said counting means counts a predetermined number of times, and outputs the count result when said counting has been carried out said predetermined number of times.

6. A demodulating apparatus for demodulating a received signal and outputting the demodulated signal to a data processing circuit, comprising:
   receiving means for receiving a signal modulated with data of predetermined value;
   demodulating means for demodulating said signal received by said receiving means;
   equalizing means for equalizing said signal demodulated by said demodulating means;
   judging means for judging, a plural number of times, the signal, equalized by said equalizing means, in accordance with the predetermined value to make a judgment result;
   correcting means for correcting an equalization characteristic of said equalizing means in accordance with the judgment result made by said judging means and said signal equalized by said equalizing means;
   means for determining whether each judgment result of said judging means is erroneous or correct; and
   counting means for counting a number of times the judgment result made by said judging means is a predetermined one of erroneous and correct, and outputting a count result, representing that a reception state of said receiving means is suitable or not suitable, to the data processing circuit.

7. An apparatus according to claim 6, wherein said determining means includes means to compare the judgment result by said judgment means with the predetermined value to determine if said judgment result, judged by said judging means is erroneous or correct.

8. An apparatus according to claim 6, wherein said counting means counts a predetermined number of times, and outputs the count result when said counting has been carried out said predetermined number of times.

9. A demodulating apparatus for demodulating a received signal and outputting the demodulated signal to a data processing circuit, comprising:
   receiving means for receiving a signal modulated in accordance with "0" data;
   demodulating means for demodulating said signal received by said receiving means and outputting demodulated data; and
   counting means for counting a number of times that said demodulated data output from said demodulating means is "1" data or "0" data, and outputting a count result, representing that a reception state by said receiving means is suitable or not suitable, to the data processing circuit.

10. An apparatus according to claim 9, wherein said apparatus compares the demodulated data with "1" data to judge if said demodulated data was demodulated by said demodulating means erroneously or correctly.

11. An apparatus according to claim 9, wherein said demodulating means includes equalizing means for equalizing said receiving signal, an output signal of said equalizing means including said demodulated data, and said counting means counts in accordance with said output signal from said equalizing means.

12. A demodulating apparatus for demodulating a received signal and outputting the demodulated signal to a data processing circuit, comprising:
   receiving means for receiving a signal modulated with data of predetermined value;
   demodulating means for demodulating said signal received by said receiving means;
   equalizing means for equalizing a signal demodulated by said demodulating means;
   judging means for judging, a plural number of times, the signal equalized by said equalizing means, in accordance with the predetermined value to make a judgment result;
   error signal outputting means for calculating an equalization error of said equalizing means, and outputting an error signal in accordance with the calculated equalization error to the data processing circuit; and counting means for counting a number of times the judgment result made by said judging means is a predetermined one of erroneous and correct, and outputting a count result, representing that a reception state by the receiving means is suitable or not suitable.

13. An apparatus according to claim 12, wherein said error signal outputting means calculates the equalization error of said equalizing means on the basis of the signal equalized by said equalizing means and the judgment result by said judging means, and outputs the error signal in accordance with the equalization error of said equalizing means.

14. An apparatus according to claim 12, wherein said error signal outputting means adds up the equalization error of said equalizing means a predetermined number of times, and outputs the error signal in accordance with the added result.

15. An apparatus according to claim 12, wherein said apparatus compares the judgment result made by said judging means with the predetermined value to determine if the judgment result, judged by said judging means, is erroneous or correct.

16. An apparatus according to claim 12, wherein said counting means counts a predetermined number of times, and outputs a count result when said counting has been carried out said predetermined number of times.

* * * * *

UNITED STATES PATENT AND TRADEMARK OFFICE
CERTIFICATE OF CORRECTION

PATENT NO. : 5,153,527
DATED : October 6, 1992
INVENTOR(S) : Tatsuya Yaguchi

It is certified that error appears in the above-indentified patent and that said Letters Patent is hereby corrected as shown below:

COLUMN 1

Line 12, "a" should be deleted.

COLUMN 2

Line 49, " $c_\ell^{r+1} = c_\ell^r - \alpha \frac{\partial (y_k - a_k)^2}{\partial c_\ell} \quad \ldots (2)$"

should read $$-- c_\ell^{r+1} = c_\ell^r - \alpha \frac{\partial (y_k - \hat{a}_k)^2}{\partial c_\ell} \quad \ldots (2)--.$$

Line 53, "gain $a_k$" should read --gain, $\hat{a}_k$--.
Line 55, "value $a_k$" should read --value $\hat{a}_k$--.

COLUMN 3

Line 6, "YiXAie$^{i\theta i}$" should read --Ÿi=Aie$^{i\theta i}$--.
Line 8, "Ai" should read --Âi--.
Line 12, "Zi-Ai" should read --Zi-Âi--.
Line 19, "Zi by Ai" should read --Zi by Âi--.

COLUMN 5

Line 55, "Ai" should read --Âi--.
Line 59, "Ai" should read --Âi--.
Line 65, "Ei=Zi-Ai" should read --Ei=Zi-Âi--.

UNITED STATES PATENT AND TRADEMARK OFFICE
CERTIFICATE OF CORRECTION

PATENT NO. : 5,153,527

DATED : October 6, 1992

INVENTOR(S) : Tatsuya Yaguchi

It is certified that error appears in the above-indentified patent and that said Letters Patent is hereby corrected as shown below:

COLUMN 6

Line 20, "Nq" should read --NQ--.
Line 22, "Ai" should read --Âi--.

COLUMN 7

Line 37, "thereof In" should read --thereof.  In--.

COLUMN 8

Line 2,  "$N_Q$" should read --NQ--.
Line 4,  "$N_Q$" should read --NQ--.
Line 23, "$N_Q$" should read --NQ--.
Line 31, "$N_Q$" should read --NQ--.
Line 32, "$N_Q$" should read --NQ--.
Line 37, "$N_Q$" should read --NQ--.

Signed and Sealed this

Seventh Day of December, 1993

Attest:

BRUCE LEHMAN

*Attesting Officer*     *Commissioner of Patents and Trademarks*